(12) United States Patent
Sugihara

(10) Patent No.: US 6,859,607 B2
(45) Date of Patent: Feb. 22, 2005

(54) OPTICAL FIBER, OPTICAL FIBER CABLE, AND RADIATION DETECTING SYSTEM USING SUCH

(75) Inventor: Hiroshi Sugihara, Tokyo (JP)

(73) Assignee: Wired Japan Co., Ltd., Tokyo (JP)

( * ) Notice: Subject to any disclaimer, the term of this patent is extended or adjusted under 35 U.S.C. 154(b) by 0 days.

(21) Appl. No.: 10/663,692

(22) Filed: Sep. 17, 2003

(65) Prior Publication Data

US 2004/0071433 A1 Apr. 15, 2004

Related U.S. Application Data

(62) Division of application No. 09/522,692, filed on Mar. 10, 2000, now Pat. No. 6,671,451.

(51) Int. Cl.⁷ .................................................. G02B 6/00
(52) U.S. Cl. ........................ 385/144; 385/12; 385/127; 385/141
(58) Field of Search ................................. 385/144, 141, 385/123, 12, 127

(56) References Cited

U.S. PATENT DOCUMENTS

| | | | |
|---|---|---|---|
| 4,788,436 A | 11/1988 | Koechner | 250/485.1 |
| 5,434,415 A | 7/1995 | Terada et al. | 250/368 |
| 5,588,084 A | 12/1996 | Johnson | 385/123 |
| 5,606,638 A | 2/1997 | Tymianski et al. | 385/143 |
| 5,629,515 A | 5/1997 | Maekawa | 250/207 |
| 5,793,046 A | 8/1998 | Jeffers et al. | 250/364 |
| 5,912,945 A | 6/1999 | DaSilva et al. | 378/205 |
| 6,310,352 B1 | 10/2001 | Gross et al. | 250/370.11 |

FOREIGN PATENT DOCUMENTS

| | | |
|---|---|---|
| DE | 43 14 031 | 11/1994 |
| JP | 407 035866 A | 2/1995 |
| WO | WO 97/35171 | 9/1997 |

*Primary Examiner*—Rodney Bovernick
*Assistant Examiner*—Sung Pak
(74) *Attorney, Agent, or Firm*—Westerman, Hattori, Daniels & Adrian, LLP

(57) ABSTRACT

The present invention provides an optical fiber, an optical fiber cable and a radiation detecting system at a low cost. Further, the radiation detecting system is provided which can adequately monitor the radiation leak without delay. The optical fiber cable comprises: an optical fiber including; a core 12 having lightwave guide property and extending along one direction; a clad layer 14 covering over a peripheral surface of the core 12; and a scintillator material dispersed in the clad layer 14 and emitting light when radiation is applied, a radiation-shielding layer 24 covering substantially over a periphery of the optical fiber10, and a gap 26 located in at least one part of the radiation-shielding layer 24. The radiation detecting system comprises an optical fiber cable 20 adapted to emit light at a region where radiation is applied and transmitting the emitted light, photoelectric conversion means 32 connected to at least one end of the optical fiber cable 20, and processing means 38 detecting when radiation is applied in accordance with an output signal of the photoelectric conversion means 32.

30 Claims, 4 Drawing Sheets

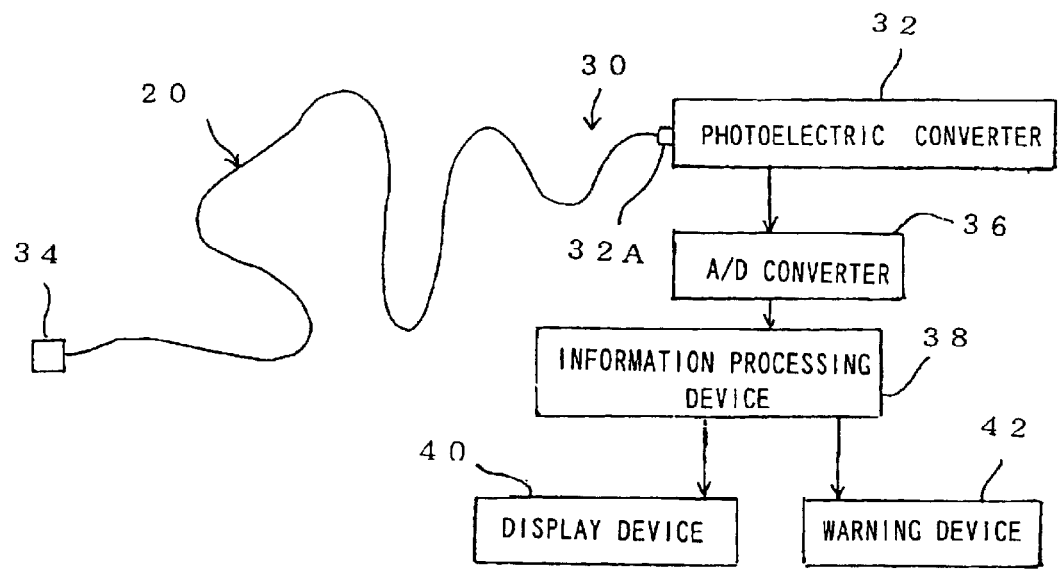
F I G. 4
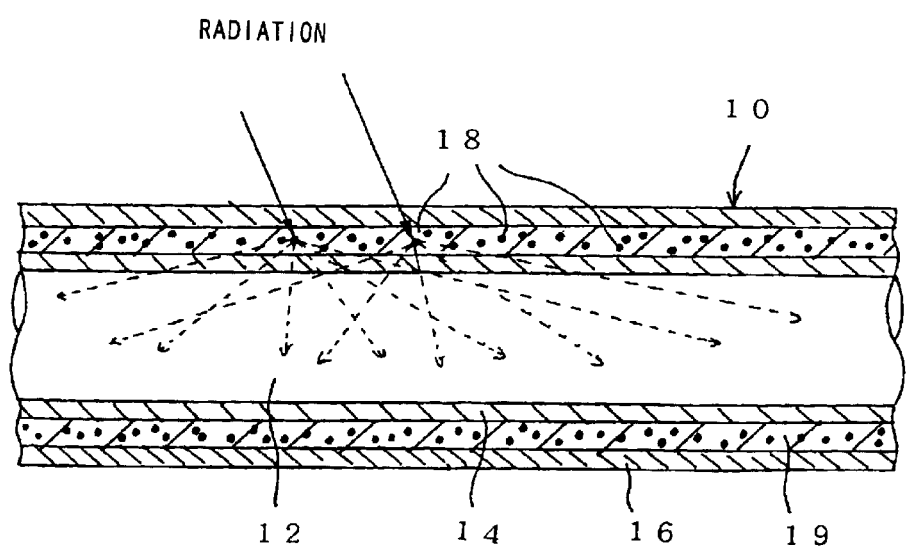
F I G. 5

OPTICAL FIBER, OPTICAL FIBER CABLE, AND RADIATION DETECTING SYSTEM USING SUCH

This application is a divisional of prior application Ser. No. 09/522,692 filed Mar. 10, 2000 now U.S. Pat. No. 6,671,451.

BACKGROUND OF THE INVENTION

1. Field of the Invention

The present invention relates to an optical fiber and an optical fiber cable interiorly providing such an optical fiber. Further the present invention relates to a radiation detecting system for monitoring radiation leak, using such an optical fiber and an optical fiber cable.

2. Prior Art

In facilities where radiation is handled or utilized, radiation leak causes a serious damage to human body. Thus various measures are taken in bar of these matter. In the unlikely event that the radiation leak occurs, some detecting system for quickly and reliably detecting this has been developed and has also come into practical use.

For example, a monitoring system, in which radiation-monitoring apparatuses such as well-known scintillometers are located at all of areas where the radiation leak potentially occurs to monitor the radiation leak all the time, has been established and used.

Since such conventional radiation-monitoring system presupposes to locate the scintillometer at each detection area and additionally the scintillometer is expensive, significant cost is necessary to construct such monitoring system. Under the circumstance usually having budget control, it may happen that the monitoring apparatuses cannot adequately be located at all of required areas. In this case, since the monitoring system does not cover every potential leak areas, it is desired to improve this defect. That is, it is eagerly desired to develop a new detecting device and an improved radiation-detecting apparatus adequately to detect the radiation leak.

SUMMARY OF THE INVENTION

The present invention has been developed in view of aforementioned circumstances. One object of the present invention is to provide an optical fiber and an optical fiber cable at a low cost. Another object of the present invention is to provide a radiation detecting system for detecting the radiation leak at a low cost.

For solving the aforementioned problem and achieving the object, in the first aspect according to the present invention., an optical fiber comprises a core having lightwave guide property and extending along one direction, a clad layer covering over a peripheral surface of the core to make a light transmitted in the core shield within the core, a scintillator material dispersed in the clad layer and emitting light when radiation is applied, wherein at least a part of the light emitted when radiation is applied to the scintillator material is transmitted within the core.

In second aspect according to the present invention, an optical fiber comprises a core having lightwave guide property and extending along one direction, a clad layer covering over a peripheral surface of the core to make a light transmitted in the core shield within the core, a detecting layer covering over a peripheral surface of the clad layer and a scintillator material dispersed in the detecting layer and emitting light when radiation is applied, wherein at least a part of the light emitted when radiation is applied to the scintillator material is transmitted through the clad layer and within the core.

In the first or second aspect, the scintillator material may be inorganic scintillator material. The radiation may also be at least one radiation selected from the group consisting of X-ray, α-ray, β-ray, and γ-ray, and the scintillator material may be emitted when any of X-ray, α-ray, β-ray, and γ-ray is applied.

In the first aspect, the optical fiber may further include a protective layer adapted to cover a peripheral surface of the clad layer. The core may be formed of quartz glass. The clad layer may be formed of transparent polymer synthetic resin. The scintillator material may also be dispersed in the clad layer by way of dope.

In second aspect, a protective layer may be adapted to cover a peripheral surface of the detecting layer. The scintillator material may be dispersed in the detecting layer by way of dope.

Further, in third aspect according to the present invention, an optical fiber cable comprises: an optical fiber including; a core having lightwave guide property and extending along one direction; a clad layer covering over a peripheral surface of the core to make a light transmitted in the core shield within the core; and a scintillator material dispersed in the clad layer and emitting light when radiation is applied, a radiation-shielding layer covering substantially over a periphery of the optical fiber, and a gap located in at least one part of the radiation-shielding layer to enable radiation to be entered into the clad layer.

Further, in fourth aspect according to the present invention, an optical fiber cable comprises: an optical fiber including; a core having lightwave guide property and extending along one direction; a clad layer covering over a peripheral surface of the core to make a light transmitted in the core shield within the core; a detecting layer covering over a peripheral surface of the clad layer; and a scintillator material dispersed in the detecting layer and emitting light when radiation is applied, a radiation-shielding layer covering substantially over a periphery of the optical fiber, and a gap located in at least one part of the radiation-shielding layer to enable radiation to be entered into the detecting layer.

In the third or fourth aspect, the optical fiber may further include a reinforcing layer adapted to cover a peripheral surface of the optical fiber. In addition, this protective layer may include bunch of reinforcing fiber extending along the one direction. Further, this reinforcing fiber may be secured on a periphery of the optical fiber with a tape winded around a periphery of the bunch of reinforcing fiber.

Further, in the third or fourth aspect, the optical fiber may further include a reinforcing layer adapted to cover a peripheral surface of the optical fiber, and the radiation-shielding layer may be adapted to cover a peripheral surface of the reinforcing layer. In addition, the tape may be coated with lead.

Further, in the third or fourth aspect, the gap may be formed over the entire length in the circumferential direction of the optical fiber. Otherwise, the gap may be formed in plural parts of the radiation-shielding layer along the one direction with a predetermined space.

Further, in the third or fourth aspect, the optical fiber cable may further include a radiotransparant tegumentary layer adapted to cover over a periphery of the radiation-shielding layer with locating as the most outer layer.

In fifth aspect according to the present invention, a radiation detecting system comprises an optical fiber cable adapted to emit light at a region where radiation is applied and transmitting the emitted light, photoelectric conversion means connected to at least one end of the optical fiber cable, and processing means detecting when radiation is applied in accordance with an output signal of the photoelectric conversion means.

In the fifth aspect, the radiation detecting system may further include an A/D conversion means between the photoelectric conversion means and the processing means to digitize the output signal. The photoelectric conversion means may include one input terminal to which one end of the optical fiber cable is connected. In addition, the optical fiber cable may further include a reflection means at another end of the optical fiber cable. Otherwise, another end of the optical fiber cable is opened.

Further, in the fifth aspect, photoelectric conversion means may include two input terminals to which both ends of the optical fiber cable are respectively connected.

Further, in the fifth aspect, the optical fiber cable may further include at least one detect portion, wherein the light emitted at the detect portion when radiation is applied to the detect portion is transmitted within the optical fiber cable. In addition, as first preferable configuration, the optical fiber cable may further include: an optical fiber having; an optical transmission core extending along one direction to transmit light emitted at the detect portion; a clad layer covering over a peripheral surface of the core; and a scintillator material dispersed in the clad layer and emitting light when radiation is applied, a radiation-shielding layer covering substantially over a periphery of the optical fiber, wherein a gap is provided with locating in at least one part of the radiation-shielding layer as the detect portion. Otherwise, as second preferable configuration, the optical fiber cable may further include: an optical fiber having; an lightwave guide core extending along one direction to transmit light emitted at the detect portion; a clad layer covering over a peripheral surface of the core to make a light transmitted in the core shield within the core; a detecting layer covering over a peripheral surface of the clad layer, a scintillator material dispersed in the detecting layer and emitting light when radiation is applied, and a radiation-shielding layer covering substantially over a periphery of the optical fiber, wherein a gap is provided with locating in at least one part of the radiation-shielding layer as the detect portion.

In these two preferable configurations, the optical fiber cable may further include a reinforcing layer adapted to cover a peripheral surface of the optical fiber, and the radiation-shielding layer may also include bunch of reinforcing fiber extending along the one direction. Further, this reinforcing fiber may be secured on a periphery of the optical fiber with a tape winded around a periphery of the bunch of reinforcing fiber.

In the first or second configuration, the radiation-shielding layer may be adapted to cover a peripheral surface of the reinforcing layer. In addition, the radiation-shielding layer may be formed by winding a tape coated with lead Further, in the first or second configuration, the gap may be formed over the entire length in the circumferential direction of the optical fiber. Otherwise, the gap may be formed in plural parts of the radiation-shielding layer along the one direction with a predetermined space.

Furthermore, in the first or second configuration, the optical fiber cable may further include a radiotransparant tegumentary layer may be adapted to cover over a periphery of the radiation-shielding layer with locating as the most outer layer. The scintillator material may also be inorganic scintillator material.

In the first configuration, the scintillator material may be dispersed in the clad layer by way of dope. In the second configuration, the scintillator material may be dispersed in the detecting layer by way of dope.

In the first or second configuration, the radiation may also be at least one radiation selected from the group consisting of X-ray, α-ray, β-ray, and γ-ray, and the scintillator material may be emitted when any of X-ray, α-ray, β-ray and γ-ray is applied.

In the first configuration, the optical fiber cable may further include a protective layer adapted to cover a peripheral surface of the clad layer. In the second configuration, the optical fiber cable may further include a protective layer adapted to cover a peripheral surface of the detecting layer.

Further, in the first or second configuration, the core may be formed of quartz glass. The clad layer may also be formed of transparent polymer synthetic resin.

These and other aspect of the present invention are apparent in the following detailed description and claims, particularly when considered in conjunction with the accompanying drawings.

BRIEF DESCRIPTION OF THE DRAWINGS

FIG. 4 is a schematic view showing a radiation detecting system using the optical fiber cable shown in FIG. 2;

FIG. 5 is a cross-sectional view showing a configuration of another embodiment of an optical fiber according to the present invention;

DETAILED DESCRIPTION OF THE PREFERRED EMBODIMENTS

Preferable embodiments provided with an optical fiber, an optical fiber cable, and a radiation detecting system according to the present invention will be described in detail thereinafter.

Figure 1:
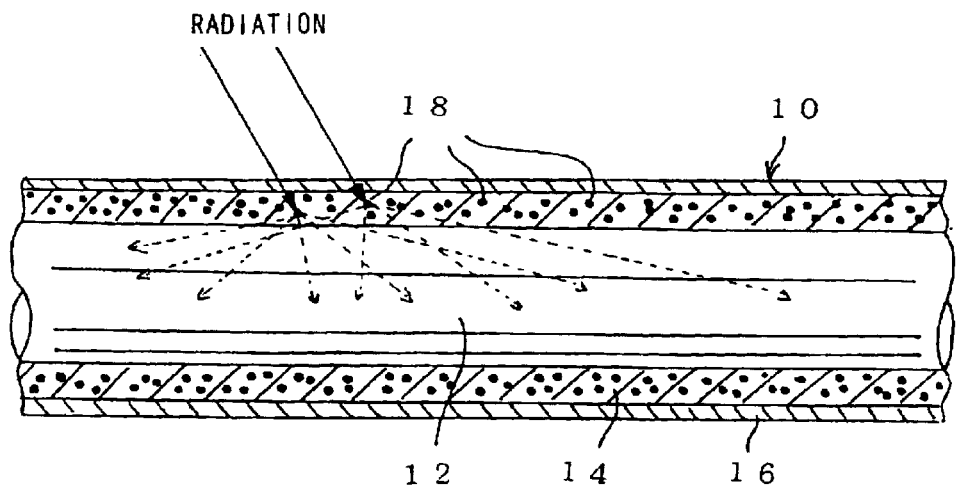
FIG. 1 is a cross-sectional showing a configuration of one embodiment of an optical fiber according to the present invention.

First of all, the optical fiber and the optical fiber cable are described with reference to FIG. 1 though FIG. 3. As shown in FIG. 1, an optical fiber 10 according to this embodiment is generally composed of a core 12 made of solid quartz glass, having lightwave guide property and extending along one direction, a clad layer 14 covering over a peripheral surface of the core 12 with appressed thereto, and a protective layer 16 protecting the clad layer 14 with covering over a peripheral surface of the clad layer 14. As is conventional, the fiber is flexible.

Here the description of the core 12, which is of well-known configuration, is abbreviated. However, it is apparent that the core 14 is not limited to be solid quartz glass and it may be made of transparent plastic material.

As material of the aforementioned clad layer 14, polymer synthetic resin, such as UV acrylate and trade name PYRO- COAT (made by SpecTron Specialty Optics Co., Avon, Conn., USA) may be applied.

As one feature of the present invention, the scintillator material 18, which is emitted when any of X-ray, α-ray, β-ray, and γ-ray is applied, is dispersed in the clad layer 14 by way of dope or other processors. Here the detailed description of the scintillator material 18, which is of well-known material, is abbreviated. In this embodiment, inorganic scintillator, such as NaI (Tl) and CsI (Tl), is applied.

As the scintillator material 18 which is emitted when X-ray is applied, in addition to NaI (Tl) described above, CaF2 (Eu), YAP (Ce) and so forth are known. As the scintillator material 18 which is emitted when α-ray is applied, in addition to CsI (Tl) described above, BaF2 and so forth are known. As the scintillator material 18 which is emitted when β-ray is applied, CaF2 (Eu) described above, BaF2 and so forth are known. As the scintillator material 18 which is emitted when γ-ray is applied, in addition to NaI (Tl) and CsI (Tl) described above, BaF2, CeF3,B4G3O12, CdWO4 and so forth are known.

The protective layer 16 is formed of a synthetic plastic material having a predetermined mechanical strength, such as trade name Tefzel (made by SpecTron Specialty Optics Co., Avon, Conn., USA). This protective layer 16 is not essential element for the optical fiber 10. Therefore the optical fiber 10 can be configured without this.

Since the optical fiber 10 is configured as described above, when a radiation, such as α-ray, β-ray, and γ-ray, is applied to this optical fiber 10, an energy, which is absorbed into the scintillator material 18 dispersed in the clad layer 14, is used to ionize and excite atom or molecule of the scintillator material 18. Then a photon is emitted when the exited atom return to ground state or the electron/ion pair resulting from the ionization is recombined through some processes. The emission of this photon is defined as the luminous phenomenon caused by the radiation.

In this manner, the scintillator material 18 emits light in response to radiation. Then this light is introduced into the core 12 through a interface between the clad layer 14 and the core 12, and is then transmitted along the direction in which the core 12 is extended.

Hereat, since the mechanical strength of the optical fiber 12 described above is not sufficient, an optical fiber cable is provided for use in a configuration described thereafter.

Figure 2:
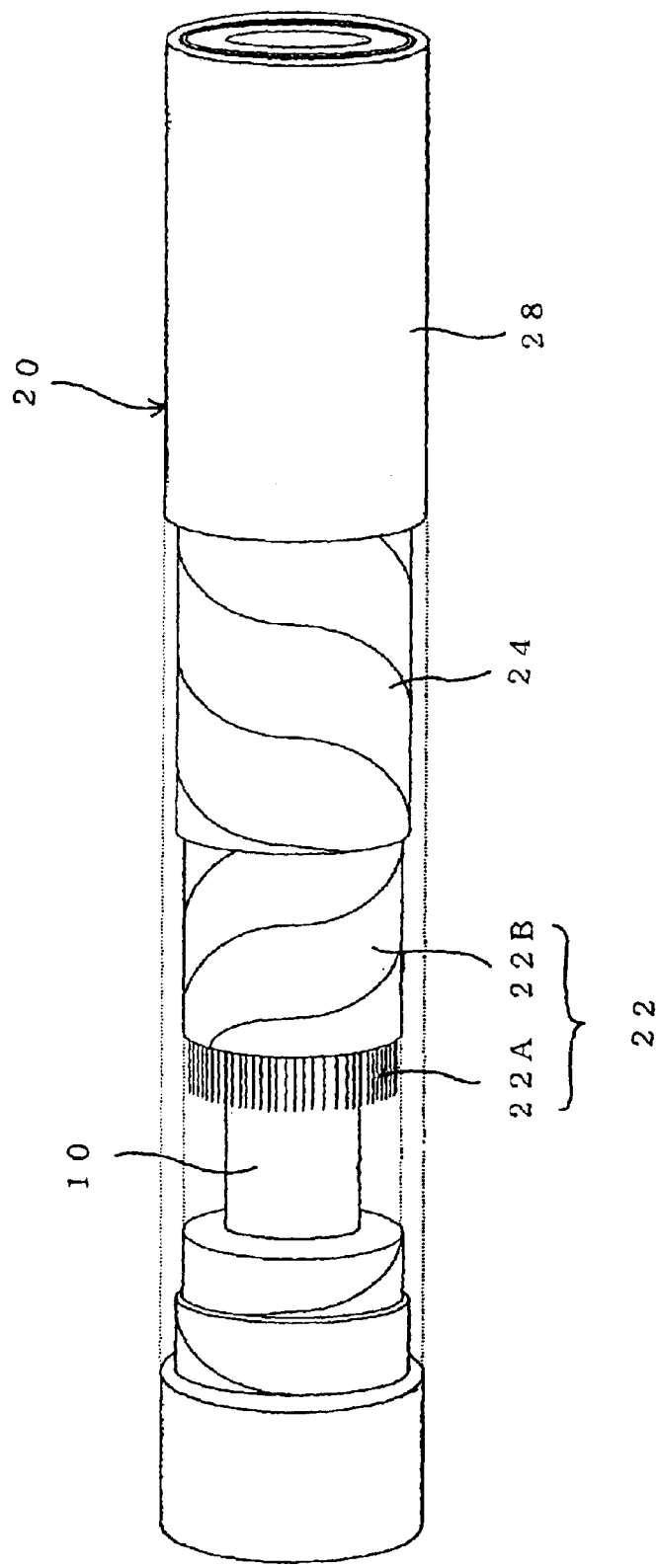
FIG. 2 is a partially perspective view showing a configuration of one embodiment of an optical fiber cable according to the present invention.

As shown in FIG. 2, this optical fiber cable 20 has an optical fiber configured in the same as the optical fiber 10 described above as an optical fiber core wire. This optical fiber cable 20 includes a reinforcing layer 22 around a peripheral surface of the optical fiber 10 to reinforce it. This reinforcing layer 22 includes bunch of reinforcing fiber 22A extending along the one direction in which the core 12 is extended and a tape 22B with which a periphery of the bunch of reinforcing fiber 22A is winded thoroughly around. The bunch of reinforcing fiber 22A is secured on a periphery of the optical fiber 10 by this tape 22A.

On a periphery of the reinforcing layer 22, a radiation-shielding layer 24 is adapted to cover substantially over the periphery of the reinforcing layer 22. In this embodiment, this radiation-shielding layer 24 is defined by a tape coated with lead. That is, the radiation-shielding layer 24 with which radiation is blocked to enter into the optical fiber 10 is configured by way of winding this lead coated tape around a periphery of the reinforcing layer 22 in spiral manner.

Figure 3:
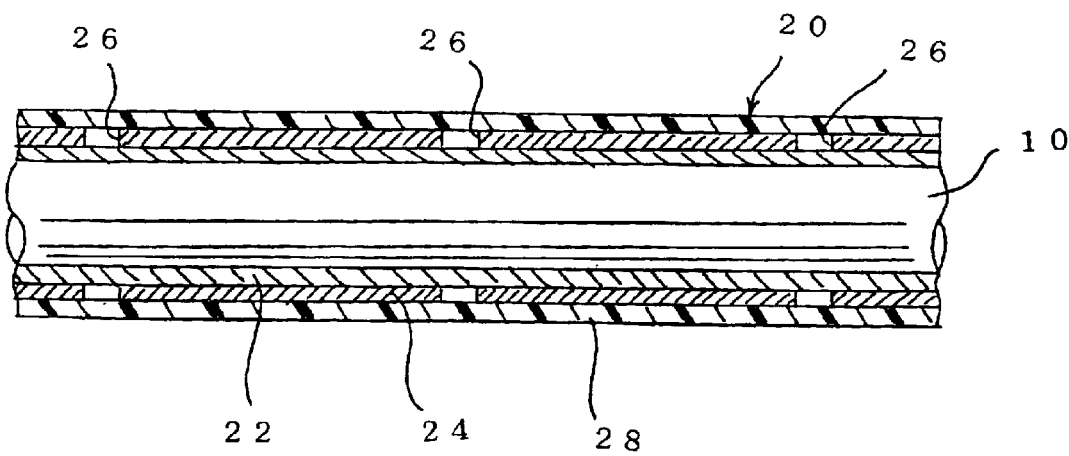
FIG. 3 is a cross-sectional view showing an arrangement of gaps of the optical fiber cable shown in FIG. 2.

As shown in FIG. 3, gaps 26 are formed in plural parts of the radiation-shielding layer 24 along the one direction described above with a predetermined space. The gap 26 is provided over the entire length in the circumferential direction of the optical fiber 10, that is, over all around the periphery of the radiation-shielding layer 24. A width of each gap 26 can optionally be determined. Specifically, when detecting radiation as described thereafter, the width may adequately be determined according to the amount of radiation to be detected.

A tegumentary layer 28, which is the most outer layer, is disposed to cover over a periphery of the radiation-shielding layer 24. This tegumentary layer 28 is made of hard synthetic resin having radiolucency to act as an outer jacket.

Since the optical fiber cable 20 is configured as decribed above, when a radiation, such as α-ray, β-ray, and β-ray, is applied to this optical fiber cable 20, the radiation is entered into the clad layer 14 through the gaps 26. Then the radiation makes the scintillator material 18 dispersed in the clad layer 14 emit light, as described above. This light is then transmitted within the core 12 of the optical fiber 10.

With reference to FIG. 4, a configuration of a radiation detecting system, i.e. a radiation leak monitoring system, for detecting radiation, i.e. for monitoring radiation leak, using the aforementioned optical fiber cable 20 will be described thereinafter.

As shown in FIG. 4, this radiation detecting system 30 has the optical fiber cable 20 configured as described above as a detecting device. One end of the optical fiber cable 20 is connected to an optical input terminal of a photoelectric converter 32, while a reflection plate 34 is mounted on another end of the optical fiber cable 20. Thus, the right reaching thereto is reflected in mirror reflection by this reflection plate 34 and is then transmitted toward the photoelectric converter 32. A electric signal output terminal of this photoelectric converter 32 is connected to a information processing device 38 through a A/D converter 36.

When radiation leak occurs at a particular position, the luminous phenomenon is caused in a region of the clad layer 14 corresponding to a gap 26 to which this radiation leak position is nearest. Then the resulting right is transmitted from this region to the opposite direction, that is, in the direction to the photoelectric converter 32 and in the direction to the reflection plate 34. Thus, the photoelectric converter 32 directly receives a part of the emitted light and also receives other light reflected by the reflection plate 34 in retard.

With a view to the phenomenon that two optical signal are entered to the photoelectric converter 32 with a predetermined time interval, the information processing device 38 is adapted to carry out an operation for determining which gap 26 was emitted, according to an interval, i.e. shifted time, of two detected signal from the electric signal output terminal.

A display device 40 for indicating the operation result and a warning device 42 are connected to the processor 38. When the radiation leak is detected, a particular warning is given and a determined radiation leak position is also indicated on the display device 40.

As described above, with using this radiation detecting system 30, radiation leak in such as a nuclear energy plant, or a research laboratory, factory and a hospital where radiation is handled, can be detected without delay so that a trouble of radiation exposure can be kept from occurring. In particular, when this optical fiber cable 20 is fully winded in spiral manner around such as a discharged air duct or drain pipe connected to a region in potential radiation leak, it is possible to easily and quickly detect a specific position where radiation leak occurs.

Further, the optical fiber cable 20 acting as such a detecting device can be produced at very low cost. Therefore, even when this optical fiber cable is fully located all of areas having potential radiation leak, the expenses would not be so high so that a radiation detecting system can highly effectively be established within a predetermined budget. Thus requirement for safety can be satisfied in a high order.

In a space satellite located in aerospace, a particular radiation-shielding means is provided for protecting loaded equipments from radiation contained in solar wind from the sun. However, when this radiation-shielding means is destroyed from some kind of reason, the loaded equipments are exposed to radiation so that their performances may potentially be deteriorated. In addition, it is difficult easily to determine which equipment is exposed to radiation. Hereat, with using this radiation detecting system 30, when some equipments are exposed to radiation, the radiation enters into the optical fiber 10 through the gap 26 located near to the exposed equipments. Thus this radiation detecting system 30 can easily realized to detect which the loaded equipment is exposed to the radiation. This utility value is extremely high.

While the present invention has been described with respect to specific embodiments, it is to be understood that the invention is not limited thereto and it can be various practiced within the scope of the present invention.

For example, while it has been described in the aforementioned embodiments that the scintillator materially is dispersed into the clad layer 14, this invention is not limited to such a configuration. That is, as another embodiment shown in FIG. 5, it can be configured that a detection layer 19 may be adapted to cover over the clad layer 14, and the scintillator material 18 may be dispersed into this detection layer 19. In this case, it is apparent that the protective layer 16 is adapted to cover the peripheral surface of the detection layer 19.

Figure 6:
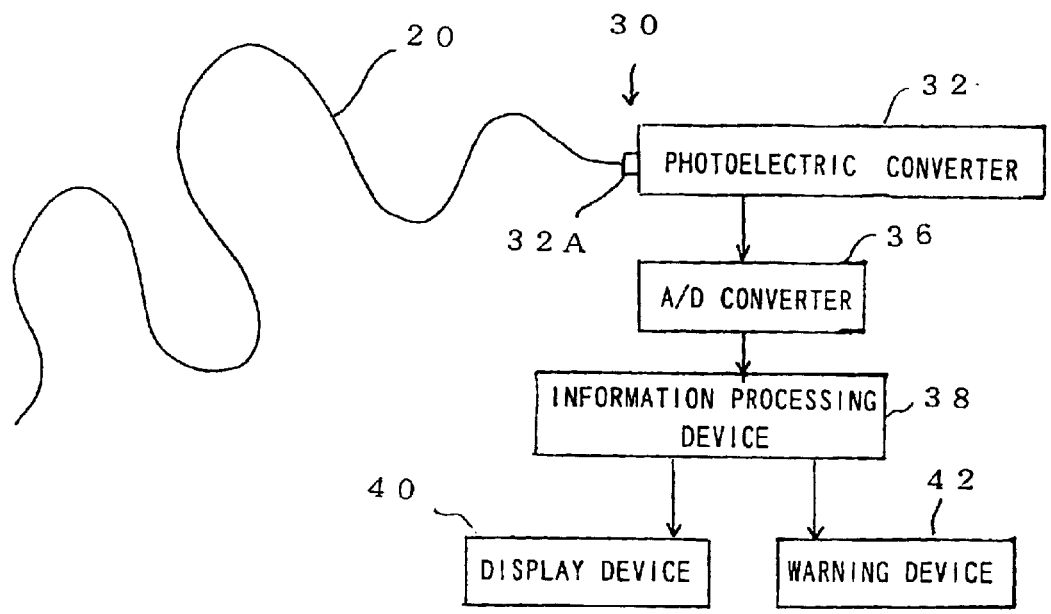
FIG. 6 is a schematic cross-sectional view showing a configuration of another embodiment of a radiation detecting system according to the present invention.

Further, in the embodiment of the radiation detecting system 30, while it has been described that the reflection plate 34 is disposed on another end of the optical fiber cable 20, this invention is not limited to such a configuration. For example, as another embodiment shown in FIG. 6, it can be configured that another end of the optical fiber cable 20 is open without the reflection plate 34.

In this case, while it is impossible to determine a position of the gap at which a radiation leak is detected, this embodiment is still effective when it is required only to detect the fact that the radiation leak occurs irrespective to a position of the leak. In particular, in the case that no operation for determining a position of the radiation leak is necessary, the information-processing device 38 can be simple in configuration so that the device can be configured at lower cost to provide a reasonable radiation detecting system in cost.

Figure 7:
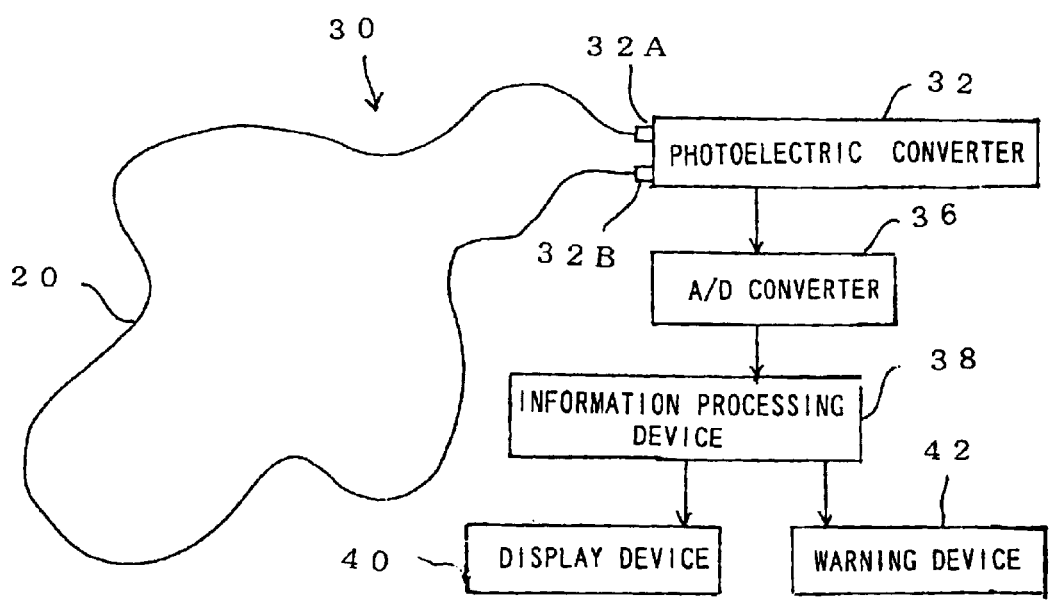
FIG. 7 is a schematic cross-sectional view showing a configuration of still another embodiment of a radiation detecting system according to the present invention.

Furthermore, in the embodiment described above, while it has been described that the photoelectric converter 32 has one optical input terminal 32A to which the one end of the optical fiber 20 is connected, this invention is not limited to such a configuration. For example, as another embodiment shown in FIG. 7, it can be configured that the photoelectric converter 32 may be include two input terminals 32 A and 32 B to which both ends of the optical fiber 20 is respectively connected. In this case, the loop-like optical fiber is applied.

As described above in detail, according to the present invention, an optical fiber, an optical fiber cable and a radiation detecting system can be provided at a low cost. Further, the radiation detecting system is provided which can adequately monitor radiation leak without delay.

What is claimed is:

1. A radiation detecting system comprising:

an optical fiber cable adapted to emit light at a region where radiation is applied and transmitting the emitted light, photoelectric conversion means connected to at least one end of said optical fiber cable, and processing means detecting when radiation is applied in accordance with an output signal of said photoelectric conversion means, wherein said optical fiber cable further includes at least one detect portion, wherein the light emitted at said detect portion when radiation is applied to said detect portion is transmitted within said optical fiber cable, and wherein said optical fiber cable further includes:

an optical fiber having an optical transmission core extending along one direction to transmit light emitted at said detect portion;

a clad layer covering over a peripheral surface of said core; and a scintillator material dispersed in said clad layer and emitting light when radiation is applied, a radiation-shielding layer covering substantially over a periphery of said optical fiber, wherein a gap is provided with locating in at least one part of said radiation-shielding layer as said detect portion, and wherein said gap is formed over the entire length in the circumferential direction of said optical fiber.

2. A radiation detecting system comprising:

an optical fiber cable adapted to emit light at a region where radiation is applied and transmitting the emitted light, photoelectric conversion means connected to at least one end of said optical fiber cable, and processing means detecting when radiation is applied in accordance with an output signal of said photoelectric conversion means, wherein said optical fiber cable further includes at least one detect portion, wherein the light emitted at said detect portion when radiation is applied to said detect portion is transmitted within said optical fiber cable, and wherein said optical fiber cable further includes:

an optical fiber having a lightwave guide core extending along one direction to transmit light emitted at said detect portion;

a clad layer covering over a peripheral surface of said core to make a light transmitted in said core shield within said core;

a detecting layer covering over a peripheral surface of said clad layer, a scintillator material dispersed in said detecting layer and emitting light when radiation is applied, and a radiation-shielding layer covering substantially over a periphery of said optical fiber, wherein a gap is provided with locating in at least one part of said radiation-shielding layer as said detect portion, and wherein said gap is formed over the entire length in the circumferential direction of said optical fiber.

3. A radiation detecting system defined in claim 1, wherein said optical fiber cable further includes a reinforcing layer adapted to cover a peripheral surface of said optical fiber.

4. A radiation detecting system defined in claim 3, wherein said radiation-shielding layer includes bunch of reinforcing fiber extending along said one direction.

5. A radiation detecting system defined in claim 4, wherein said reinforcing fiber be secured on a periphery of said optical fiber with a tape winded around a periphery of said bunch of reinforcing fiber.

6. A radiation detecting system defined in claim 2, wherein said optical fiber cable further includes a reinforcing layer adapted to cover a peripheral surface of said optical fiber.

7. A radiation detecting system defined in claim 6, wherein said radiation-shielding layer includes bunch of reinforcing fiber extending along said one direction.

8. A radiation detecting system defined in claim 7, wherein said reinforcing fiber be secured on a periphery of said optical fiber with a tape winded around a periphery of said bunch of reinforcing fiber.

9. A radiation detecting system defined in claim 1, wherein said radiation-shielding layer is adapted to cover a peripheral surface of said reinforcing layer.

10. A radiation detecting system defined in claim 9, wherein said radiation-shielding layer is formed by winding a tape coated with lead.

11. A radiation detecting system defined in claim 2, wherein said radiation-shielding layer is adapted to cover a peripheral surface of said reinforcing layer.

12. A radiation detecting system defined in claim 11 wherein said radiation-shielding layer is formed by winding a tape coated with lead.

13. A radiation detecting system defined in claim 1, wherein said gap is formed in plural parts of said radiation-shielding layer along said one direction with a predetermined space.

14. A radiation detecting system defined in claim 2, wherein said gap is formed in plural parts of said radiation-shielding layer along said one direction with a predetermined space.

15. A radiation detecting system defined in claim 1, wherein said optical fiber cable further includes a radiotransparant tegumentary layer is adapted to cover over a periphery of said radiation-shielding layer with locating as the most outer layer.

16. A radiation detecting system defined in claim 2, wherein said optical fiber cable further includes a radiotransparant tegumentary layer is adapted to cover over a periphery of said radiation-shielding layer with locating as the most outer layer.

17. A radiation detecting system defined in claim 1, wherein said scintillator material is inorganic scintillator material.

18. A radiation detecting system defined in claim 17, wherein said scintillator material is dispersed in said clad layer by way of dope.

19. A radiation detecting system defined in claim 18, wherein said scintillator material is dispersed in said detecting layer by way of dope.

20. A radiation detecting system defined in claim 2, wherein said scintillator material is inorganic scintillator material.

21. A radiation detecting system defined in claim 20, wherein said scintillator material is dispersed in said clad layer by way of dope.

22. A radiation detecting system defined in claim 21, wherein said scintillator material is dispersed in said detecting layer by way of dope.

23. A radiation detecting system defined in claim 1, wherein said radiation is at least one radiation selected from said group consisting of X-ray, α-ray, β-ray, and γ-ray, and said scintillator material is emitted when any of X-ray, α-ray, β-ray and γ-ray is applied.

24. A radiation detecting system defined in claim 2, wherein said radiation is at least one radiation selected from said group consisting of X-ray, α-ray, β-ray, and γ-ray, and said scintillator material is emitted when any of X-ray, α-rayfc, β-ray and γ-ray is applied.

25. A radiation detecting system defined in claim 1, wherein said optical fiber cable further includes a protective layer adapted to cover a peripheral surface of said clad layer.

26. A radiation detecting system defined in claim 2, wherein said optical fiber cable further includes a protective layer adapted to cover a peripheral surface of said detecting layer.

27. A radiation detecting system defined in claim 1, wherein said core is formed of quartz glass.

28. A radiation detecting system defined in claim 2, wherein said core is formed of quartz glass.

29. A radiation detecting system defined in claim 1, wherein said clad layer is formed of transparent polymer synthetic resin.

30. A radiation detecting system defined in claim 2, wherein said clad layer is formed of transparent polymer synthetic resin.

* * * * *